(12) United States Patent
Saito et al.

(10) Patent No.: US 8,876,442 B2
(45) Date of Patent: Nov. 4, 2014

(54) ROTARY CUTTER

(75) Inventors: Manabu Saito, Tokyo (JP); Tatsuo Nakahata, Tokyo (JP); Hideharu Takahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1077 days.

(21) Appl. No.: 12/889,959

(22) Filed: Sep. 24, 2010

(65) Prior Publication Data

US 2011/0070042 A1 Mar. 24, 2011

(30) Foreign Application Priority Data

Sep. 24, 2009 (JP) ................................. 2009-218392

(51) Int. Cl.
*B23B 51/06* (2006.01)
*B23B 31/20* (2006.01)
*B23Q 11/10* (2006.01)

(52) U.S. Cl.
CPC ............ *B23B 31/20* (2013.01); *B23Q 11/1023* (2013.01); *B23B 2231/24* (2013.01); *B23B 2250/12* (2013.01); *B23Q 11/103* (2013.01)
USPC ................. 408/59; 409/136; 279/20

(58) Field of Classification Search
CPC .................................................. B23Q 11/1046
USPC .............. 408/56, 57, 58, 59, 60, 61; 409/135, 409/136; 279/20
See application file for complete search history.

(56) References Cited

U.S. PATENT DOCUMENTS 3,024,030 A * 3/1962 Koch .............................. 279/20
3,364,800 A * 1/1968 Benjamin et al. ......... 408/239 R
(Continued)

FOREIGN PATENT DOCUMENTS

DE 298 13 998 U1 10/1998
EP 1 813 369 A1 8/2007
(Continued)

*Primary Examiner* — Eric A Gates
*Assistant Examiner* — Paul M Janeski
(74) *Attorney, Agent, or Firm* — Konomi Takeshita

(57) ABSTRACT

The object of the invention is to stably spray cutting fluid in a good mist form, when cutting fluid and air are supplied from the surrounding area and cutting fluid is sprayed in a mist form from the tip end section of a rotary cutting tool. The rotary cutter of the present invention sequentially feeds a mixture of cutting fluid and air through a supply pipe 4, first supply path b in a cover 3, second supply paths c, d in a chuck 2, a hollow center cavity (front throttle chamber d, throttle 24a, and rear throttle chamber e) in the chuck, and a third supply path g in a rotary cutting tool 1. The first supply path and second supply path are intermittently connected when the respective openings thereof face each other as the cover and chuck turn relative to each other; the second supply path sprays fluid toward the throttle; the front throttle chamber is formed such the diameter thereof expands from the second supply path; the throttle is formed such that the diameter thereof is less than the smallest diameter of the second supply path; the rear throttle chamber is formed by the rear end surface of the rotary cutting tool and the inner conical surface on the down-flow side of the throttle when that rear end surface and inner conical surface on the down-flow side come in close contact with each other; and the front throttle chamber is formed such that the capacity thereof is greater than that of the rear throttle chamber.

10 Claims, 5 Drawing Sheets

(56) References Cited

U.S. PATENT DOCUMENTS

| | | | |
|---|---|---|---|
| 3,561,299 A * | 2/1971 | Brisk | 408/59 |
| 4,080,090 A * | 3/1978 | Kern | 408/59 |
| 4,570,952 A * | 2/1986 | Heimbigner et al. | 279/20 |
| 4,693,646 A * | 9/1987 | Andrews | 409/136 |
| 4,708,538 A * | 11/1987 | Kubo et al. | 408/59 |
| 5,419,661 A * | 5/1995 | Meachum | 408/57 |
| 5,439,333 A * | 8/1995 | Kubo | 409/136 |
| 5,601,386 A * | 2/1997 | Wells | 408/57 |
| 5,615,836 A * | 4/1997 | Graef | 239/428.5 |
| 5,649,714 A * | 7/1997 | Uchida et al. | 279/20 |
| 5,676,506 A * | 10/1997 | Sugata | 409/136 |
| 6,287,058 B1 * | 9/2001 | Arai et al. | 409/132 |
| 6,557,784 B1 * | 5/2003 | Nakamura et al. | 239/427 |
| 6,899,496 B2 * | 5/2005 | Sugata et al. | 409/136 |
| 6,926,478 B2 * | 8/2005 | Sugata et al. | 409/136 |
| 6,981,825 B2 * | 1/2006 | Sugata et al. | 409/136 |
| 7,160,067 B2 * | 1/2007 | Perry et al. | 409/234 |
| 7,192,228 B2 * | 3/2007 | Haenle et al. | 409/234 |
| 7,293,943 B1 * | 11/2007 | Matsumura et al. | 409/136 |
| 2002/0033081 A1 * | 3/2002 | Hara | 82/1.11 |
| 2002/0119019 A1 * | 8/2002 | Hara | 409/131 |
| 2003/0133766 A1 * | 7/2003 | Makiyama | 409/136 |
| 2004/0079207 A1 * | 4/2004 | Matsumura et al. | 82/158 |
| 2007/0292225 A1 * | 12/2007 | Suzuki | 409/131 |
| 2011/0222976 A1 * | 9/2011 | Uchiuzo et al. | 408/59 |

FOREIGN PATENT DOCUMENTS

| | | | |
|---|---|---|---|
| JP | S63-053647 U | | 4/1988 |
| JP | H05-13476 | | 4/1993 |
| JP | H07-35699 | | 8/1995 |
| JP | 2003-181743 | | 7/2003 |
| JP | 2005329487 A | * | 12/2005 |
| JP | 2008264924 A | * | 11/2008 |

* cited by examiner

ROTARY CUTTER

CROSS REFERENCE TO RELATED APPLICATIONS

This application claims priority under 35 U.S.C. 119 based upon Japanese Patent Application No. 2009-218392, filed on Sep. 24, 2009. The entire disclosure of the aforesaid application is incorporated herein by reference.

FIELD OF THE INVENTION

The present invention relates to a rotary cutter that sprays a mist comprising a cutting fluid and air from the tip end section of a rotary cutting tool such as a drill.

BACKGROUND OF THE INVENTION

Conventionally, cutting fluid such as cutting oil or water soluble coolant has been supplied to the cutting portion (cutting blade or cut material) in order to lubricate and cool the cutting portion in a rotary cutting process. Supplying cutting fluid to the cutting portion has been performed by an external supply method in which cutting fluid is supplied from outside the rotary cutting tool, as well as by an internal supply method in which cutting fluid is supplied from a hole that is formed in the rotary cutting tool (see Japanese Unexamined Patent Application Publication No. 2003-181743, Japanese Utility Model Application Publication No. H7-35699, Japanese Utility Model Application Publication No. H5-13476).

The supply path for the cutting fluid in the internal supply method is preferably a center-type supply path in which the center of the fluid path is located through the center of rotation. In the case of a center-type supply path, connection of the supply path from a non-rotating section to a rotating section can be performed relatively easily, and it is possible to reduce the effect of centrifugal force on the fluid that flows through the supply path.

However, a center-type supply path is limited to mechanical construction having a path that penetrates completely through the center of rotation, making the range of application narrow. Therefore, a peripheral-type supply path is employed that supplies cutting fluid from the perimeter separated from the center of rotation of the tool supporting end of the rotating shaft, and pulls in the supply path toward the center of rotation inside the cutter.

In the case of a peripheral-type supply path, the path is not limited to mechanical construction that rotates and drives a rotary cutting tool, so the path can be widely applied to use in various kinds of rotary type machine tools such as existing lathes and the like. However, in the case of a peripheral-type supply path, connection of the supply path from a non-rotating section to a rotating section must be performed at a location that is separated from the center of rotation by a specified radius, and the supply path may need to bend in at least one location. In addition, a supply path that is separated from the center of rotation also has the disadvantage in that the effect of centrifugal force on the fluid flowing inside the flow path is relatively large.

Recently, supplying a combination of cutting fluid and air in the form of a mist is advantageous. By supplying cutting fluid in the form of a mist, it is possible to uniformly supply cutting fluid to the cutting portion using only a small amount of fluid, which not only improves processing efficiency and life of the cutting tool, but also makes it possible to conserve on cutting fluid and promote the improvement of cleanliness and work efficiency, as well as makes it possible to supply a mixture of oil mist and water mist.

However, in order to supply a combination of cutting fluid and air in the form of a mist in a conventional rotary cutter having a peripheral-type supply path, there are the following problems.

In a convention rotary cutter having a peripheral-type supply path, even though a combination of cutting oil and air in the form of a mist is supplied from around the principal rotating shaft, mist is not sprayed well from a spray orifice that is provided on the tip end section of the rotary cutting tool, with part sometimes being output in liquid form, or mist is sprayed intermittently or in a pulse-like manner, making it difficult to spray mist stably and steadily. Moreover, due to that effect, it is difficult to reduce the diameter of the supply path inside the rotary cutting tool, and thus it is difficult to apply this type of supply path to small diameter rotary cutting tools.

The reason that the mist spray become unstable is that mist that is supplied from the perimeter of the main rotating shaft returns to a liquid form when it comes in contact with the inner wall of the supply path due to centrifugal force, and cutting fluid that builds up inside the supply path after returning to a liquid form affects the flow of the cutting fluid in mist form so the output of mist becomes intermittent and pulse-like, causing an unstable mist spray.

Even by increasing the supply pressure of the mist in order to overcome the effect of the centrifugal force, mist still returns to the liquid form when the mist comes in contact with the inner wall of a bent or curved portion of the supply path, so it is difficult to avoid the same result.

SUMMARY OF THE INVENTION

Taking into consideration the aforementioned problems with the related art, the object of the present invention is to provide a rotary cutter that is capable of stably spraying a good quality mist, as cutting fluid and air are supplied from around a main rotating shaft, and a mixture of cutting fluid and air are sprayed in mist form from the tip end section of a rotary cutting tool that is held by that main rotating shaft.

According to a first embodiment of the present invention for solving the problems described above, there is provided a rotary cutter, comprising:

a chuck that grips and holds a rotary cutting tool, and is fastened to a main rotating shaft; and a cover having a cylindrical section that covers and comes in close contact around the circumference of part of the outer peripheral surface of the chuck such that sliding movement is possible, and is supported such that rotation is not possible; wherein the cover has a first supply path;

the chuck has a second supply path and a hollow center cavity;

the rotary cutting tool has a third supply path that is formed such that openings on the rear end surface and the tip end section are connected;

a fluid-air mixture of cutting fluid and air is sequentially fed through the first supply path, second supply path, the hollow center cavity and the third supply path, and the cutting fluid is sprayed in mist form from the tip end section of the rotary cutting tool;

a throttle is formed at a position on the axis of rotation inside the hollow center cavity such that the throttle divides the hollow center cavity into a front throttle chamber that is connected to the second supply path and a rear throttle chamber that is connected to the third supply path; and the second supply path is located such that the fluid-air mixture is sprayed toward the throttle.

According to a second embodiment of the present invention there is provided the rotary cutter according to embodiment 1, wherein a supply pipe that feeds the fluid-air mixture of cutting fluid and air is connected to an outside opening of the first supply path;

the first supply path is formed such that it penetrates the peripheral wall of the cylindrical section;

the second supply path is formed such that one end opens up to the outer peripheral surface and the other end opens up to the hollow center cavity; and during relative movement between the cover and the chuck, the first supply path and the second supply path are connected when at least part of an inside opening of the first supply path faces at least part of an outside opening of the second supply path, and are disconnected when the inside opening of the first supply path is covered by the outer peripheral surface and the outside opening of the second supply path is covered by the inner peripheral surface of the cover.

According to a third embodiment of the present invention, there is provided the rotary cutter according to the embodiment for embodiment 2, wherein the throttle is formed such that the diameter is less than the smallest diameter of the second supply path.

According to a fourth embodiment of the present invention, there is provided the rotary cutter according to any one of the embodiments 1 to 3, wherein the front throttle chamber is formed such that the diameter expands from the second supply path, and the front throttle chamber is formed such that the capacity thereof is greater than that of the rear throttle chamber.

According to a fifth embodiment of the present invention, there is provided the rotary cutter according to any one of the embodiments 1 to 4, wherein the rear throttle chamber is formed by being enclosed by the rear end surface of the rotary cutting tool and the conical shaped inner surface on the down-flow side of the throttle, when the edge around that rear end surface comes in contact with that conical shaped inner surface on the down-flow side.

According to a sixth embodiment of the present invention, there is provided the rotary cutter according to any one of the embodiments 1 to 5, wherein the entire second supply path or the part that includes the inside opening is formed such that the inner diameter is equal to or less than the inner diameter of a fluid-air mixture outlet orifice of the supply pipe.

According to a seventh embodiment of the present invention, there is provided the rotary cutter according to any one of the embodiments 1 to 6, wherein the outside opening of the second supply path is formed wider than the down-flow side part of the second supply path, and the maximum inner dimension in the circumferential direction is greater than the maximum inner dimension in the axial direction.

According to an eighth embodiment of the present invention, there is provided the rotary cutter according to embodiment 7, wherein the outside opening of the second supply path is formed such that both end sections along the circumferential direction increase in width gradually going toward the middle section.

According to a ninth embodiment of the present invention, there is provided the rotary cutter according to embodiment 7, wherein a flow path continuing in the down-flow direction from the outside opening of the second supply path is formed at a position that is offset further toward the rear in the direction of rotation than the center position of the outside opening.

According to a tenth embodiment of the present invention, there is provided the rotary cutter according to any one of the embodiment 1 to 9, wherein the chuck comprises:

a gripping piece that grips and holds the rotary cutting tool by constricting when tightened;

a throttle piece that forms the throttle;

a cylindrical holder that receives the gripping piece and the throttle piece from the front end side and holds them on the inside, and the rear end is fastened to the main rotating shaft;

a nut that engages with the gripping piece, threadably mounts on the holder and makes tightening possible by pressing the outer taper of the gripping piece toward the inner taper of the holder; and an O-ring that seals between the throttle piece and inner surface of the holder; wherein the outer peripheral surface that comes in close contact with and slides with respect to the cover is formed around the holder, the second supply path is formed in the holder, and a stepped section that holds the O-ring in place is formed around the inner surface of the holder such that the rear end side thereof becomes narrow;

conical shaped inner surfaces are formed in the throttle piece on both sides of the throttle such that the diameters thereof constrict in the direction toward the throttle, and a rear end surface is formed around the conical inner surface on the up-flow side;

an opening on the rear end side of the holder is covered by the holder being tightly fastening to the main rotating shaft;

together with tightening performed by turning the nut, the front throttle chamber and the rear throttle chamber are formed by forcing the throttle piece backward by pressing the rear end of the rotary cutting tool against the conical inner surface on the down-flow side of the throttle piece, thereby compressing and holding the O-ring between the rear end surface of the throttle piece and the stepped section of the holder; and the second supply path opens up to the front throttle chamber further on the rear end side than the O-ring.

With the present invention, due to intermittent connection between a first supply path and a second supply path, a mixture of cutting fluid and air that is fed from a supply pipe is concentrated and fed to the second supply path for a specified connection period without the internal pressure dropping, then is sprayed as is toward a throttle without being overcome by centrifugal force and without colliding into the inner wall that is separated from the throttle, and thus, being kept from returning to a liquid form, the mixture smoothly and quickly reaches the throttle that is located on the axis of rotation.

Even when the change of the cutting fluid to a mist form in the front throttle chamber is not adequate, the action of the throttle sufficiently changes the cutting fluid to a mist form, after which, by passing and feeding the cutting fluid though a rear throttle chamber, which is concentratedly located on or near the axis of rotation, and through a third supply path, the invention has the advantage of being able to spray cutting fluid in a mist form from the tip end section of a rotary cutting tool while keeping the cutting fluid from returning to a liquid form due to centrifugal force.

Moreover, with the present invention, the front throttle chamber is formed such that the diameter thereof expands from the second supply path, and the throttle is formed such that the diameter is less than the minimum diameter of the second supply path, and the front throttle chamber is formed such that the capacity thereof is greater than that of the rear throttle chamber. Therefore, during the period that the first supply path and second supply path are connected, pressurized cutting fluid and air builds up in the front throttle chamber, and the front throttle chamber reaches a maximum pressure. The pressurized cutting fluid and air that is built up in the front throttle chamber is gradually fed from the throttle, and even when the first supply path and second supply path are disconnected, the internal pressure in the front throttle chamber is kept from dropping suddenly, and drops relatively smoothly. Before the drop in internal pressure becomes to extreme, the next connection period between the first supply path and second supply path begins, and the front throttle chamber returns to the maximum pressure by a relatively small rise in pressure. As a result, there is an effect of suppressing pulsation of the spray from the tip end section of the rotary cutting tool, and thus it is possible to stably spray cutting fluid in a mist form from the tip end of the rotary cutting tool. In other words, providing a throttle, and providing a front throttle chamber that has a relatively large surface area and large volume, has an effect of easing pulsating change.

All of the second supply path or the part that includes the inside opening is preferably formed such that the inner diameter is less than the inner diameter of the discharge outlet for the fluid-air mixture from the supply pipe.

Moreover, the outside opening of the second supply path is preferably formed such that the outside opening of the second supply path is formed wider than the down-flow side part of the second supply path and the maximum inner dimension in the circumferential direction is greater than the maximum inner dimension in the axial direction.

Furthermore, the outside opening of the second supply path is preferably formed such that the width between both end points in the circumferential direction gradually increases going in the axial direction toward the center of the outside opening.

In addition, the flow path that continues down-flow from the outside opening of the second supply path is preferably formed at a position that is offset in the circumferential direction from the center position of that outside opening.

By doing this, it is possible to suitably maintain a connection period between the first supply path and second supply path, smoothly introduce the fluid-air mixture that is fed from the supply pipe to the second supply path, and forcefully spray the fluid-air mixture toward the throttle while keeping the mixture from returning to a liquid state without the pressure dropping.

DETAILED DESCRIPTION OF THE INVENTION

In the following, one embodiment of the present invention will be explained with reference to the accompanying drawings. The following is only one embodiment of the present invention, and does not limit the invention.

Figure 1:
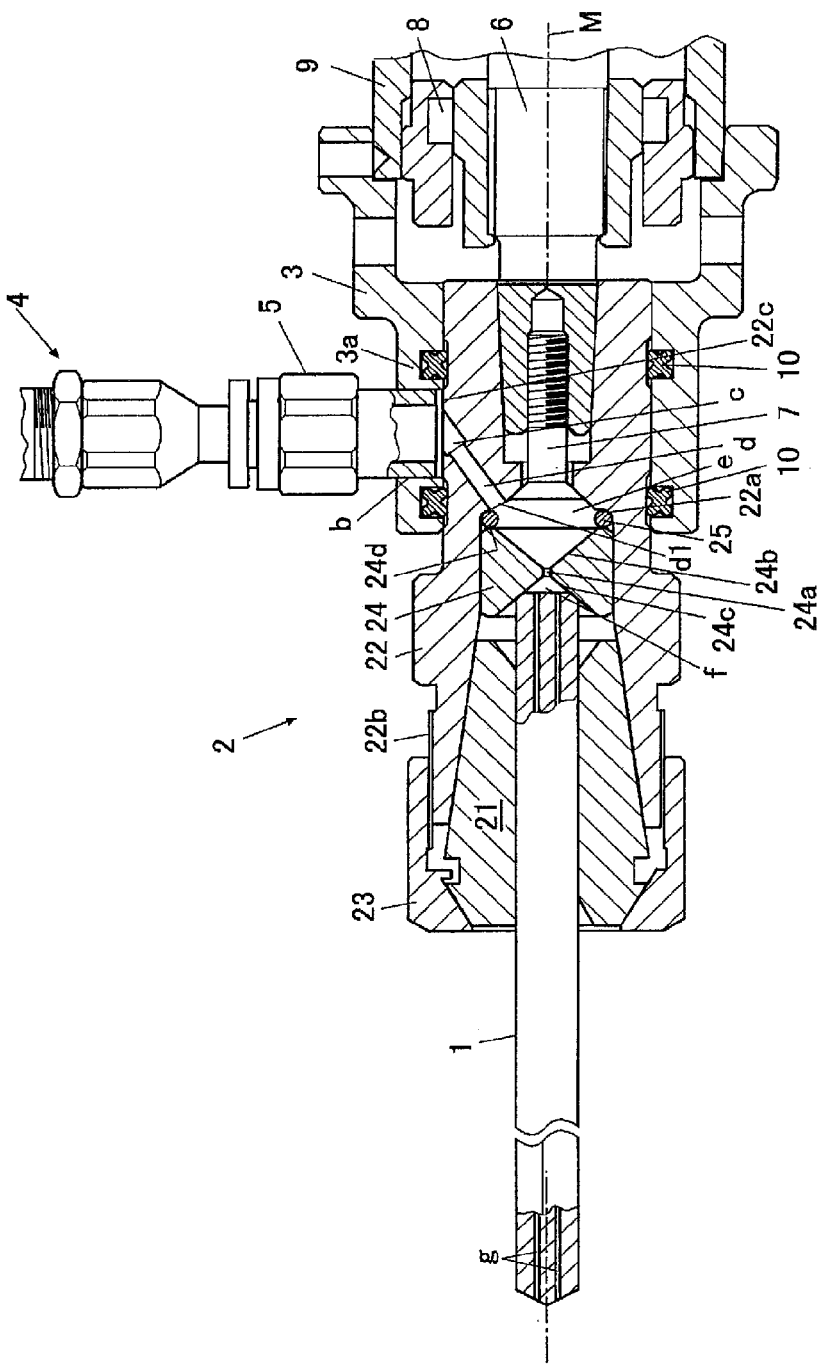
FIG. 1 is a cross-sectional view of the main parts of the rotary cutter of one embodiment of the present invention.
Figure 2:
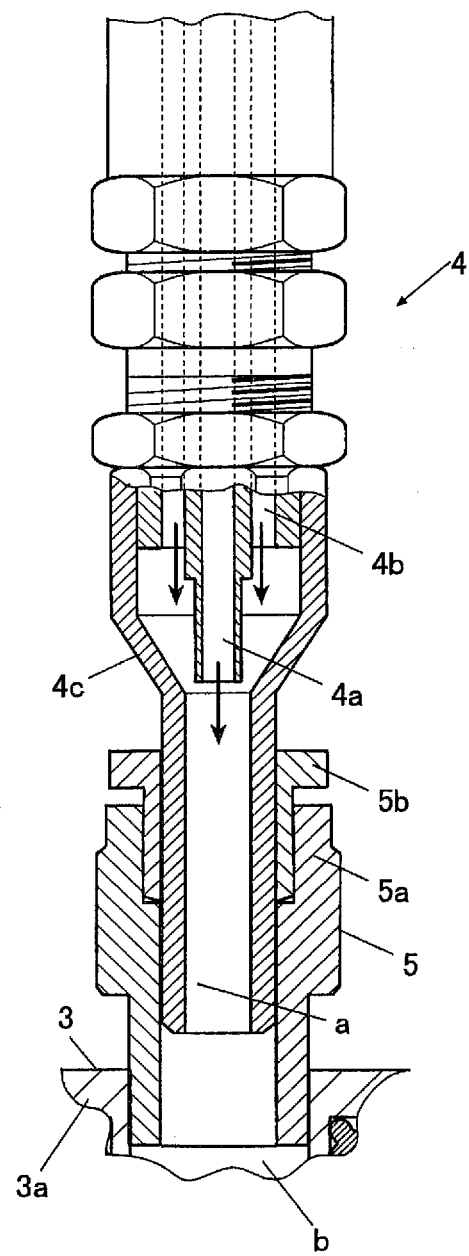
FIG. 2 is a cross-sectional view of the connection section of a supply pipe of one embodiment of the present invention.
Figure 3:
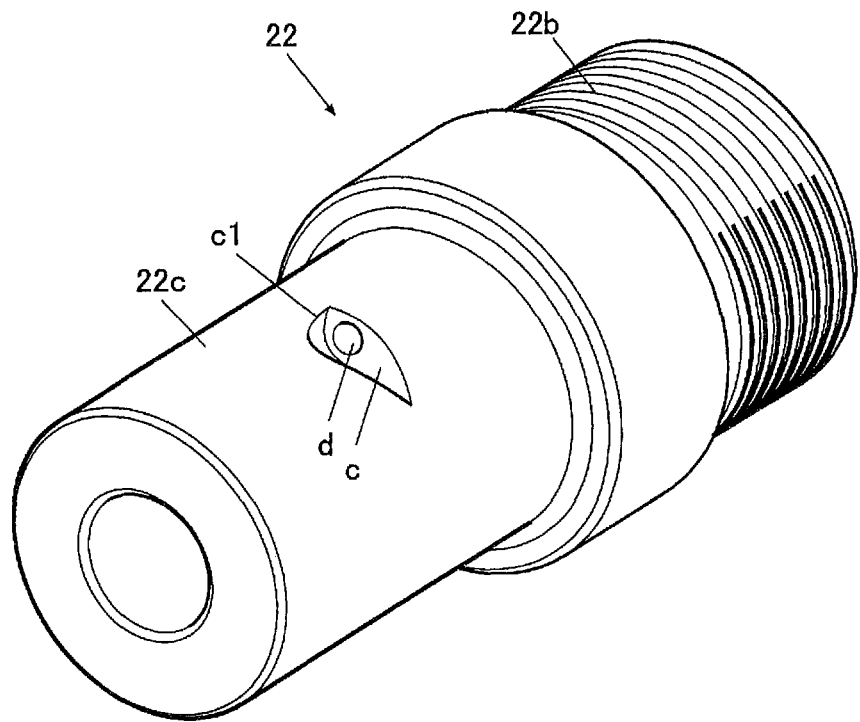
FIG. 3 is a perspective view of a collet holder of one embodiment of the present invention.

As illustrated in FIG. 1, FIG. 2 and FIG. 3, the rotary cutter of one embodiment of the present invention comprises a drill 1, a chuck 2, a cover 3, a supply pipe 4 and a connector 5 as a rotary cutting tool.

The chuck 2 is a collet chuck and comprises a collet 21, a collet holder 22, a collet nut 23, a throttle piece 24 and an O-ring 25.

The chuck 2 grips and holds the drill 1.

The collet holder 22 has a cylindrical shape with tapered surfaces on both ends such that the rear end of the collet holder 22 threadably mounts on the main rotating shaft 6, and the collet holder 22 and main rotating shaft 6 are fastened together by a flush bolt 4. This covers the opening on the rear end of the collet holder 22.

To further assemble, after the fastening with the flush bolt 7, the O-ring 25 is inserted from the opening on the front end of the collet holder 22. A stepped section 22a is formed around the inner surface of the collet 22 such that the rear end side is more narrow than the front end side. The O-ring 25 is held in place at the stepped section 22a and prevented from moving further toward the rear end side.

After that, the throttle piece 24 is inserted from the opening on the front end of the collet holder 22. Inside the throttle piece 24, conical shaped inner surfaces 24b, 24c that constrict movement toward the throttle 24a are formed on both sides of the throttle 24a, and a rear end surface 24d is formed around the conical shaped inner surface 24b on the up-flow side. The rear end surface 24d of the collet holder 22 comes in contact with and is stopped by the front end of the O-ring 25.

The conical shaped inner surface 24b on the up-flow side and the conical shaped inner surface 24c on the down-flow side are conically shaped such that the apex of each is located at the throttle 24a. Moreover, both surfaces have the same slope angle. Therefore, the piece can be used in the reversed direction.

Next, the rear end section of the collet 21 is inserted into the opening on the front end of the collet holder 22 such that the external tapered surface of the rear end section of the collet 21 fits with the inner taper of the front end section of the collet holder 22. The drill 1 is then inserted into the collet 21.

Male screw threads 22b are formed around the outer surface of the front end section of the collet holder 22, and the collet nut 23 is screwed on to the male screw threads 22b of the collet holder 22 and tightened. At the very latest, the rear end of the drill 1 comes in contact with the conical shaped inner surface 24c on the down-flow side of the throttle piece when the collet nut 23 begins to be tightened.

The collet nut 23 engages with the front end section of the collet 21 and restricts forward movement of the collet 21. Therefore, when the collet nut 23 is tightened, the external taper of the collet 21 presses against the inner table of the collet holder 22.

In so doing, the collet 21 grips and holds the drill 1 by constricting as tightened. At the same time, the rear end of the drill 1 is pressed against the conical shaped inner surface 24c on the down-flow side and presses the throttle piece 24 toward the rear such that the O-ring 25 is compressed and held between the rear end surface 24d of the throttle piece 24 and the stepped section 22a of the collet holder 22. The O-ring 25 forms a seal between the throttle 24 and the inner surface of the collet holder 22.

This completes the front throttle chamber e and rear throttle chamber f. By compressing and deforming the cross section of the O-ring 25 in the pressed direction (rotating shaft direction), the seal increases, and as the collet nut 23 is tightened the drill 1 is allowed to move toward the rear and the collet 21 can completely grip and hold the drill 1.

The hollow center cavity that is formed in the center of rotation of the chuck 2 is divided by the throttle 24a into a front throttle chamber e and rear throttle chamber f, forming the throttle 24a on the axis of rotation M.

The rear throttle chamber f is enclosed by the rear end surface of the drill 1 and the conical shaped inner surface 24c on the down-flow side of the throttle 24a, when the edge around the rear end surface of the drill 1 comes in close contact with the conical shaped inner surface 24c on the down-flow side of the throttle 24a. The front throttle chamber e is formed such that it has larger capacity than the rear throttle chamber f.

On the other hand, the main rotating shaft 6 is supported by an external cylindrical frame 9 by way of a bearing 8. The rear end of a cylindrical cover 3 is fastened around the external cylindrical frame 9 such that it does not rotate. When doing this, the cylindrical section 3a on the front end side of the cover 3 comes in close contact with and covers around the outer surface 22c of the collet holder 22 such that sliding between the surfaces is possible. A first supply path b is formed in the cylindrical section 3a such that it penetrates from the outside to the inside through the peripheral wall.

A supply pipe 4 that feeds a mixture of cutting fluid and air is connected to the opening on the outside of the first supply path b by way of a connector 5.

As illustrated in FIG. 2, the supply pipe has double-pipe construction, where the inner pipe 4a feeds cutting fluid at a specified pressure in the direction of the arrow, and the outer pipe 4b feeds air at a specified pressure in the direction of the arrow. A nozzle 4c is attached to the tip end of the supply pipe 4. Inside this nozzle 4c, the cutting fluid, which is in a mist form, is mixed with air to become a fluid-air mixture, and is then fed out to the first supply path b.

An air valve and cutting fluid valve (not shown in the figure) are provided in the base end direction of the supply pipe 4 such that the air value regulates the amount of air supplied, and the cutting fluid valve regulates the amount of cutting fluid supplied, so as a result, the fluid-air ratio of cutting fluid and air is regulated.

The connector 5 comprises a hollow bolt 5a that screws into and is fastened to the female threads that are formed around the inner surface of the first supply path b, and a nipple 5b that fits inside the opening on the outer end of the hollow bolt 5a.

The nozzle 4c on the tip end section of the supply pipe 4 fits inside the nipple 5b such the supply pipe 4 is attached.

A second supply path is formed in the collet holder 22. The second supply path (c+d) comprises a small-diameter section d on the down-flow side and a wide section c that is formed such that it widens with respect to the small-diameter section, with the portion having the largest area being an opening c1 on the outside. The small-diameter section d is formed such that the inner diameter thereof is equal to or less than the inner diameter of the fluid-air mixture outlet orifice a of the supply pipe 4.

One end of the second supply path opens up to the outer surface 22c, and the other end opens up to the front throttle chamber 3. Therefore, the small-diameter section d of the second supply path and the front throttle chamber e are connected. The small-diameter section d of the second supply path opens up to the front throttle chamber e further on the rear end side than the O-ring 25.

The opening c1 on the outside of the second supply path (see FIG. 3) is located such that it links the first supply path b with the wide section c of the second supply path as the collet holder rotates.

The second supply path is formed in a straight line that is sloped with respect to the axis of rotation M as it moves forward going from the opening c1 on the outside to the opening d1 on the inside. The throttle 24a is located at nearly the same position where the center axis of the flow path of this second supply path crosses the axis of rotation M. With this arrangement, the fluid that is sprayed from the small-diameter section d of the second supply path is sprayed toward the throttle 24a. In order for a smooth feed, the second supply path may be formed into a curved shape that swells on the flush bolt 7 side, however manufacturing a straight shape is easier. When formed into a curved shape, the second supply path is placed such that the fluid that is finally sprayed from the second supply path is sprayed toward the throttle 24a.

X-rings 10, 10 that prevent leakage from the supply path are held at the front and rear between the inner surface of the cylindrical section 3a of the cover 3 and the outer surface 22c of the collet holder 22.

Third supply paths g, g are formed in the drill 1. One end of the third supply paths g, g open up to the tip end of the drill 1, and the other end opens up to the rear end surface of the drill 1. The opening on the tip end section of the drill 1 becomes the spray orifice for the cutting fluid mist. This spray orifice is located on the relief surface of the cutting blade that is formed on the tip end of the drill 1, and opens up toward the front. Moreover, it is also possible to form an opening of the third supply paths g, g on the side section of the tip end section of the drill 1 as another spray orifice.

The front throttle chamber e is formed such that the diameter expands from the small-diameter section d of the section supply path. The throttle 24a is formed such that it has a smaller diameter than the smallest diameter (diameter of the small-diameter section d) of the second supply path. The rear throttle chamber f is connected to the third supply paths g, g.

The rotary cutter that is constructed as described above feeds a fluid-air mixture of cutting fluid and air through the supply pipe 4, first supply path b, second supply (c+d), hollow cavity (front throttle chamber e throttle 24a rear throttle chamber f), third supply paths g, g, and sprays the cutting fluid in mist form from the tip end section of the drill 1.

Figure 4:
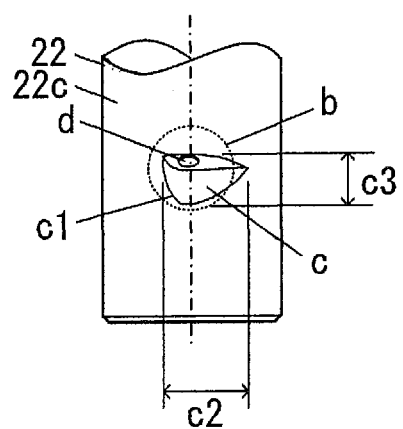
FIG. 4 is a side view of the collet holder section of one embodiment of the present invention.

Next, referencing FIG. 3 to FIG. 6, the second supply path and the opening/closing mechanism thereof will be explained. As illustrated in FIG. 3 and FIG. 4, the opening c1 on the outside of the second supply path is formed such that the largest internal dimension c2 in the circumferential direction is larger than the largest internal dimension c3 in the axial direction.

Not being related to this embodiment, it is also possible to have the entire second supply path be a small-diameter section d that is less than the inside diameter of the fluid-air mixture orifice of the supply pipe without having a wide section c. However, by having a wide section c that has an opening c1 on the outside that is shaped as described above on the lead in part of the second supply path as in this embodiment, the connection period between the first supply path and the second supply path can be adequately secured, and the fluid-air mixture that is fed from the supply pipe 4 can be smoothly led to the second supply path (c+d).

In addition, as illustrated in FIG. 4, the outside opening c1 of the second supply path is formed such that width between both end points in the circumferential direction gradually increases going in the axial direction toward the center of the outside opening c1.

Moreover, as illustrated in FIG. 4, the small-diameter section d that continues in the down-flow direction from the outside opening c1 of the second supply path is formed such that it is located offset in the circumferential direction from the center position of the outside opening c1.

Figure 5:
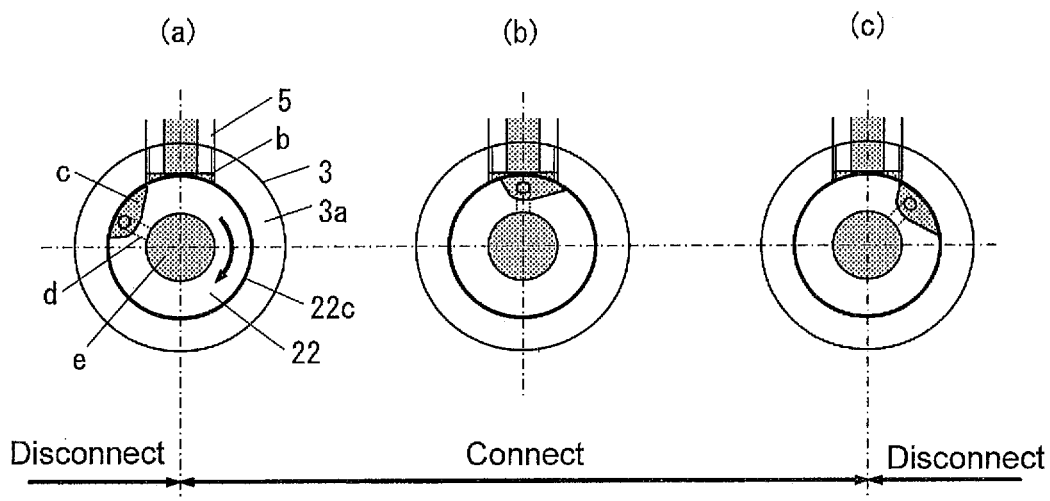
FIG. 5 is a cross-sectional view of a second supply path opening/closing mechanism that is formed on the chuck of one embodiment of the present invention.
Figure 6:
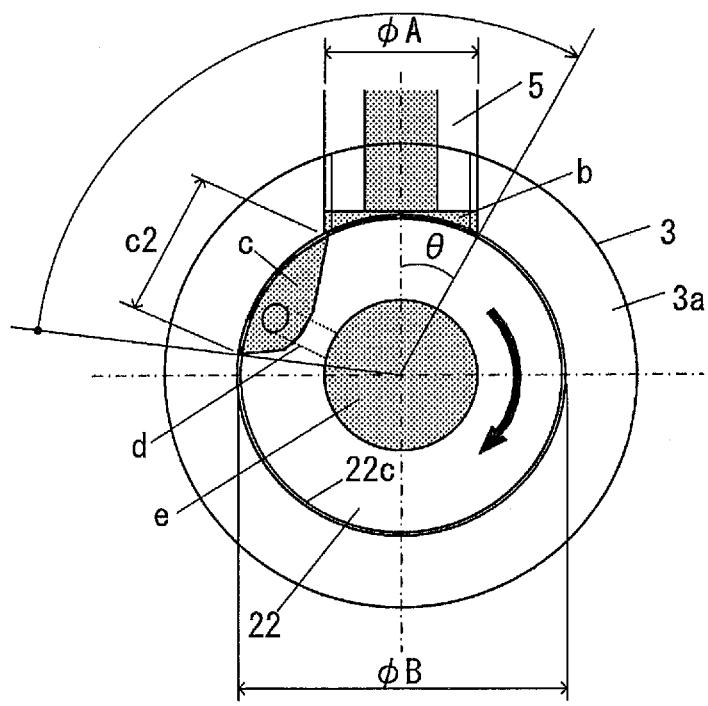
FIG. 6 is a supplementary view for calculating the opening angle of the second supply path opening/closing mechanism that is formed on the chuck of one embodiment of the present invention.

The collet holder 22 rotates as illustrated by the arrows in (a) of FIG. 5 or in FIG. 6. Therefore, the small-diameter section d is formed at a position that is offset from the center position of the outside opening c1 toward the rear of the direction of rotation.

With the construction described above, the fluid-air mixture that is fed from the supply pipe 4 is led by the wide section c of the second supply path and smoothly enters into the small-diameter section d of the second supply path.

In this embodiment, the wide section c is processed by an end mill. The shape illustrated in the figures is obtained by placing the end mill parallel to the center-axis direction of the small-diameter section d, and cutting the outer diameter section of the collet holder 22.

As illustrated in FIG. 5, the first supply path b and second supply path (c+d) are connected such that at least part of the inside opening of the first supply path b and at least part of the outside opening c1 of the second supply path face each other during relative rotation of the cover 3 and collet holder 22, where when the inside opening of the first supply path b is covered by the outer surface 22c of the collet holder, and the outside opening c1 of the second supply path is covered by the inner surface of the cover 3, the openings become disconnected.

Therefore, the change period (a)→(b)→(c) of FIG. 5 becomes the connection period of the first supply path b and second supply path (c+d), and the change period (c)→(a) of FIG. 5 is the disconnected period of the first supply path b and second supply path (c+d).

As illustrated in FIG. 6, the inner diameter of the first supply path b is taken to be $\phi A$. In this embodiment, the inner diameter $\phi A$ of the first supply path b is formed such that it is equal to the maximum inner diameter c2 in the circumferential direction of the outside opening c1 of the section supply path. In other words, $\phi A = c2$.

The outer diameter of the collet holder 22, and the inner diameter of the cylindrical section 3a of the cover 3 are essentially equal, and taken to be $\phi B$.

According to the conditions described above, the relative angle that proceeds to the connection period between the first supply path b and second supply path (c+d) is 4 times the angle in the figure, or in other words, becomes 4θ. This is called the opening angle of the second supply path opening/closing mechanism. When $\phi B = 22$ mm, by making $\phi A = c2 = 10$ mm it is possible to spray a good mist. In this case, the opening angle 4θ of the second supply path opening/closing mechanism is calculated to be 114° from the geometrical relationship illustrated in FIG. 6. Even when $\phi Bn$ is other than 22 mm, it is preferred that the opening angle be formed such that it is about 114°.

Here, the operation of this rotary cutter will be explained.

To use this rotary cutter, first a motor that drives the main shaft 6 is turned and the main shaft 6 is rotated. In doing so, the main rotating shaft 6, chuck 2 and drill 1 rotate together.

Next, the air valve of the supply pipe 4 is opened a desired opening amount, and then the cutting fluid valve is opened a desired opening amount.

After doing so, cutting fluid that is sprayed from the inner pipe 4a of the supply pipe 4 turns into mist form as described above and is mixed with air that is sprayed from the outer pipe 4b, and nozzle 4c generates a fluid-air mixture of cutting fluid and air and feeds that mixture to the first supply path b via the connector 5.

The fluid-air mixture that is sprayed from the nozzle 4c is stopped by the outer surface 22c during the period that the first supply path b and the second supply path (c+d) are disconnected, however, during that time the internal pressure increases, so that during the period when the first supply path b and second supply path (c+d) are connected, the mixture enters the wide section c of the second supply path with intense pressure. The fluid-air mixture that enters into the wide section c is led to the small-diameter section d of the second supply path.

The fluid-air mixture that enters the small-diameter section d passes through the inside opening d1 and flies through the space of the front throttle chamber e and sprayed into the throttle 24a.

Moreover, the mixture is once again put into a mist form by the throttle 24a, after which it passes through the rear throttle chamber f, and third supply paths g, g inside the drill 1 and finally the cutting fluid is sprayed from the tip end section of the drill 1 in mist form.

As described above, due to the intermittent connection between the first supply path b and second supply path (c+d), the fluid-air mixture of cutting fluid and air that is fed from the supply pipe 4 is fed in to the second supply path (c+d) during the limited connection period without the internal pressure dropping, is sprayed toward the throttle 24a as is without being overcome by centrifugal force, and while being kept from returning again to a liquid state, arrives smoothly and quickly at the throttle 24a that is located at the top of the rotating shaft.

Moreover, nearly the entire surface of the front end side of the front throttle chamber e is formed from the up-flow side conical inner surface 24b, the side section of the front throttle chamber e is fastened to the maximum diameter section of the up-flow side conical inner surface 24b by an O-ring 25 that coincides with the inner diameter, and the rear end side of the front throttle chamber e also is sealed without creating a space further toward the rear than the inside opening d1 of the second supply path, so there is no space where fluid can easily accumulate. In the case that a part of the cutting fluid did return to a liquid form, most of that would be captured by the up-flow side conical inner surface 24b and returned to a mist form by the throttle 24a.

Furthermore, by feeding the mixture through the rear throttle chamber f and third supply paths g, g that are concentrated on or around the axis of rotation M, the cutting fluid is suppressed from returning again to a liquid state, and the cutting fluid can be sprayed from the tip end section of the drill 1 in a mist form.

In this embodiment, the front throttle chamber e is formed such that the diameter thereof is larger than the small-diameter section of the second supply section, the throttle 24a is formed such the diameter thereof is smaller than the smallest diameter of the second supply path, and the front throttle chamber e is formed such that the capacity thereof is greater than that of the rear throttle chamber f.

By doing so, even though intermittent injection of a fluid-air mixture is employed, there is an effect of alleviating pulse-like change in the mist form cutting fluid that is sprayed from the tip end section of the drill 1. This will be explained with reference to FIG. 7.

Figure 7:
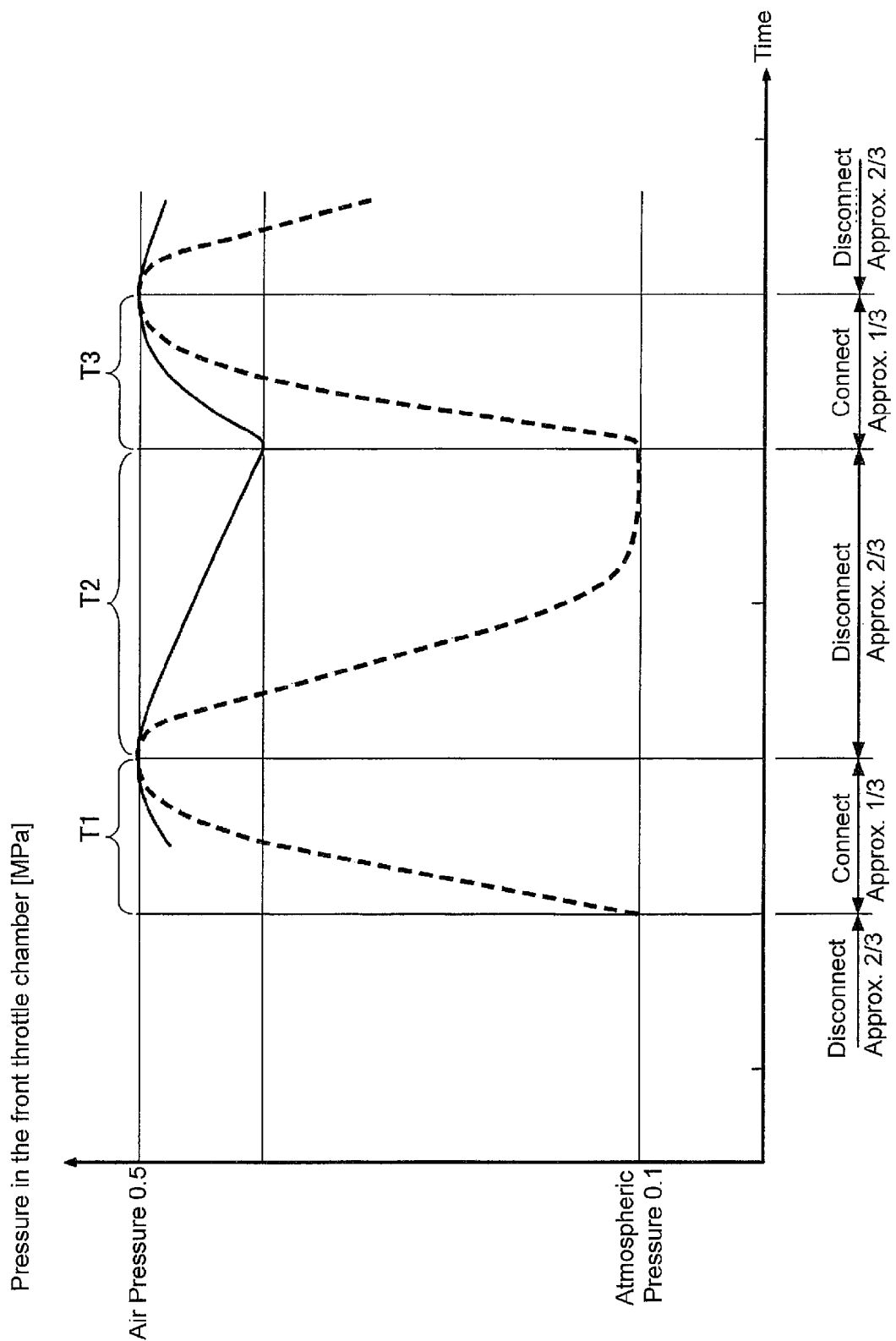
FIG. 7 is a graph illustrating the change over time of the front throttle chamber that is formed in the chuck of one embodiment of the present invention.

FIG. 7 illustrates the case in which the connected period between the first supply path b and the second supply path (c+d) is approximately ⅓ of one cycle, and the disconnected period is approximately ⅔ of one cycle. The solid-line graph in FIG. 7 illustrates the change over time of the pressure in the front throttle chamber e of this embodiment, and the dashed-line graph illustrates the change over time of the pressure in a comparative example in which the throttle is increased in size with respect to this embodiment (includes the case in which there is absolutely no constriction in the central hollow cavity). The air pressure inside the supply pipe 4 is taken to be approximately 0.5 MPa.

During the connected period T1 of the first supply path b and second supply path (c+d), pressurized cutting fluid and air accumulates in the front throttle chamber e. At the end of the connected period T1, the front throttle chamber e reaches a maximum pressure (approximately 0.5 MPa).

In this embodiment, the pressurized cutting fluid and air that accumulates in the front throttle chamber e is gradually output from the throttle 24a, so even during the disconnected period T2, the internal pressure inside the front throttle chamber is kept from dropping rapidly and decreases relatively slowly. However, in the comparison example, the internal pressure dropped suddenly and decreased to atmospheric pressure at the end of the disconnected period T2.

On the other hand, in this embodiment, before the drop in internal pressure becomes too remarkable, the next connected period T3 arrives and the front throttle chamber e returns to the maximum pressure (approximately 0.5 MPa) with just a little rise in pressure. As a result, it is possible to suppress the pulse-like spray from the tip end section of the drill 1 and to stably spray cutting fluid in mist form from the tip end section of the drill 1. However, in the comparison example, the internal pressure goes through repetitions of changing between the maximum pressure (approximately 0.5 MPa) and atmospheric pressure, so the pulse-like change in the spray becomes extreme.

In the comparative example, in order to suppress the pulse-like change, it is necessary to either increase the percentage of the connected period T1, T3, or increase the diameter of the flow path of the second supply path.

However, when the percentage of the connected times is increased, the flow rate when letting the fluid-air mixture in decreases, and there is a possibility that the mixture will be overcome by centrifugal force and become liquid again on the inner wall. When the diameter of the flow path is increased, the space where cutting fluid builds up increases, and is not preferred.

However, with this embodiment, even though the percentage of the connected times T1, T3 is small, and the diameter of the flow path of the second supply path is small, the fluid-air mixture is directed into the front throttle chamber e in a short period at high pressure and high speed, so it is possible to prevent the entering mixture from returning to a liquid form; and by further providing a small-diameter throttle 24a that is less than the minimum diameter of the second supply path, and providing a front throttle chamber e having a relatively large surface area and large volume, the pressurized fluid-air mixture is charged in the front throttle chamber e; and by supplying the charged pressurized fluid-air mixture to the third supply paths g, g inside the drill 1a little amount at a time from the throttle 24a during the connected time T2, it is possible to suppress the pulse-like change and to stably spray the mixture in mist form even in the case of a small-diameter drill in which the third supply paths g, g are relatively small.

In the embodiment described above, the rotary cutter was taken to be a drill, however the present invention is not limited to this, and of course could also be applied to other rotary cutting tools such as a reamer, end mill and the like.

What is claimed is:

1. A rotary cutter, comprising:
a chuck that grips and holds a rotary cutting tool, and is fastened to a main rotating shaft; and
a cover having a cylindrical section that covers and comes in close contact around the circumference of part of an outer peripheral surface of said chuck such that sliding movement is possible, and is supported such that rotation is not possible;
wherein
said cover has a first supply path;
said chuck has a second supply path and a hollow center cavity;
said rotary cutting tool has a third supply path that is formed such that openings on a rear end surface and a tip end section are connected;
a fluid-air mixture of cutting fluid and air is fed in order through said first supply path, said second supply path, said hollow center cavity and said third supply path to the tip end section, and said fluid-air mixture of cutting fluid is sprayed in mist form from the tip end section of said rotary cutting tool;
a throttle is formed at a position on the axis of rotation inside said hollow center cavity such that said throttle divides said hollow center cavity into a front throttle chamber that is connected to said second supply path and a rear throttle chamber that is connected to said third supply path;
said second supply path is oriented such that said fluid-air mixture is sprayed toward said throttle;
said throttle is configured to return said fluid-air-mixture that is sprayed out from said second supply path to mist form; and
said fluid-air mixture is sprayed in mist form from the tip end section of said rotary cutting tool after passing through said rear chamber and said third supply path;
wherein
a supply pipe that feeds said fluid-air mixture of cutting fluid and air is connected to an outside opening of said first supply path;
said first supply path is formed such that it penetrates a peripheral wall of said cylindrical section;
said second supply path having two ends is formed such that one of the two ends opens up to said outer peripheral surface and an other end of the two ends opens up to said hollow center cavity; and
during relative movement between said cover and said chuck, said first supply path and said second supply path are connected when at least a part of an inside opening of said first supply path faces at least a part of an outside opening of said second supply path, and are disconnected when the inside opening of said first supply path is covered by said outer peripheral surface and the outside opening of said second supply path is covered by an inner peripheral surface of said cover.

2. The rotary cutter according to claim 1, wherein
said throttle is formed such that a diameter thereof is less than a smallest diameter of said second supply path.

3. The rotary cutter according to claim 1, wherein
said front throttle chamber is formed such that a diameter thereof expands from said second supply path, and said front throttle chamber is formed such that the capacity thereof is greater than that of the rear throttle chamber.

4. The rotary cutter according to claim 1, wherein
said rear throttle chamber is formed by being enclosed by the rear end surface of said rotary cutting tool and a conical shaped inner surface on a down-flow side of said throttle, when an edge around the rear end surface comes in contact with the conical shaped inner surface on the down-flow side.

5. The rotary cutter according to claim 1, wherein
the entire said second supply path or a part that includes an inside opening is formed such that the inner diameter is equal to or less than the inner diameter of a fluid-air mixture outlet orifice of said supply pipe.

6. The rotary cutter according to claim 1, wherein
an outside opening of said second supply path is formed wider than a down-flow side part of the second supply path, and the maximum inner dimension in the circumferential direction is greater than the maximum inner dimension in the axial direction.

7. The rotary cutter according to claim 6, wherein
the outside opening of said second supply path having two edge sections along the circumferential direction, is formed such that the two edge sections increase in width gradually going toward a middle section of the outside opening.

8. The rotary cutter according to claim 6, wherein
a flow path continuing in a down-flow direction from said outside opening of said second supply path is formed at a position that is offset from a center position of the outside opening further rearward from a direction of rotation.

9. The rotary cutter according to claim 1, wherein said fluid-air mixture that is fed into said first supply path is in mist form.

10. A rotary cutter, comprising:
a chuck that grips and holds a rotary cutting tool, and is fastened to a main rotating shaft; and
a cover having a cylindrical section that covers and comes in close contact around the circumference of part of an outer peripheral surface of said chuck such that sliding movement is possible, and is supported such that rotation is not possible;
wherein
said cover has a first supply path;
said chuck has a second supply path and a hollow center cavity;
said rotary cutting tool has a third supply path that is formed such that openings on a rear end surface and a tip end section are connected;
a fluid-air mixture of cutting fluid and air is fed in order through said first supply path, said second supply path, said hollow center cavity and said third supply path to the tip end section, and said fluid-air mixture of cutting fluid is sprayed in mist form from the tip end section of said rotary cutting tool;
a throttle is formed at a position on the axis of rotation inside said hollow center cavity such that said throttle divides said hollow center cavity into a front throttle chamber that is connected to said second supply path and a rear throttle chamber that is connected to said third supply path;
said second supply path is oriented such that said fluid-air mixture is sprayed toward said throttle;
said throttle is configured to return said fluid-air-mixture that is sprayed out from said second supply path to mist form; and
said fluid-air mixture is sprayed in mist form from the tip end section of said rotary cutting tool after passing through said rear chamber and said third supply path;
wherein
said chuck comprises:
a throttle piece that forms said throttle;
a gripping piece configured to reduce a diameter thereof when being tightened, to grip and hold said rotary cutting tool;
a cylindrical holder configured to receive said gripping piece and said throttle piece from a front end side and to hold said gripping piece and said throttle piece inside, a rear end thereof being fastened to said main rotating shaft;
a nut that engages with said gripping piece, threadably mounts on said holder and makes said tightening possible by pressing an outer taper of said gripping piece toward an inner taper of said holder; and
an O-ring that seals between said throttle piece and inner surface of said holder; wherein
said outer peripheral surface that comes in close contact with and slides with respect to said cover is formed around said holder, said second supply path is formed in said holder, and a stepped section that holds said O-ring in place is formed around the inner surface of said holder such that the rear end side thereof becomes narrow;
conical shaped inner surfaces are formed in said throttle piece on both sides of said throttle such that the diameters thereof constrict in the direction toward said throttle, and a rear end surface is formed around the conical inner surface on the up-flow side;
an opening on the rear end side of said holder is covered by said holder being tightly fastening to said main rotating shaft;
with said tightening performed by turning said nut, said front throttle chamber and said rear throttle chamber are formed by forcing said throttle piece backward by pressing the rear end of said rotary cutting tool against the conical inner surface on the down-flow side of said throttle piece, thereby compressing and holding said O-ring between said rear end surface of said throttle piece and said stepped section of said holder; and
said second supply path opens up to said front throttle chamber further on the rear end side than said O-ring.

\* \* \* \* \*